(12) United States Patent
Lewallen

(10) Patent No.: US 7,127,724 B2
(45) Date of Patent: Oct. 24, 2006

(54) METHOD AND APPARATUS FOR PROVIDING PROTOCOL INDEPENDENT NAMING AND LIFE CYCLE SERVICES IN AN OBJECT-ORIENTED SYSTEM

(75) Inventor: Stephen Lewallen, Cupertino, CA (US)

(73) Assignee: International Business Machines Corporation, Armonk, NY (US)

( * ) Notice: Subject to any disclaimer, the term of this patent is extended or adjusted under 35 U.S.C. 154(b) by 237 days.

(21) Appl. No.: 09/244,291

(22) Filed: Feb. 3, 1999

(65) Prior Publication Data
US 2003/0088708 A1 May 8, 2003

(51) Int. Cl.
*G06F 9/00* (2006.01)
(52) U.S. Cl. .................. 719/332; 719/315; 719/316
(58) Field of Classification Search ............. 709/331, 709/332, 319; 707/1, 103 R–103 Z; 719/315, 719/316, 332
See application file for complete search history.

(56) References Cited

U.S. PATENT DOCUMENTS 5,212,790 A * 5/1993 Ohler et al. ............... 717/104
6,199,082 B1 * 3/2001 Ferrel et al. ............... 715/522
6,263,379 B1 * 7/2001 Atkinson ................... 709/332
6,363,433 B1 * 3/2002 Nakajima .................. 709/313
6,460,058 B1 * 10/2002 Koppolu et al. ........... 345/738

* cited by examiner

*Primary Examiner*—William Thomson
*Assistant Examiner*—Andy Ho
(74) *Attorney, Agent, or Firm*—Kudirka & Jobse, LLP

(57) ABSTRACT

A framework based Java naming and lifecycle services system includes a Moniker class which universally identifies an instance of any object model, whether the instance exists or not. Moniker objects instantiated from the Moniker class operate with a set of directory service classes and object adapters to create a directory service framework and a mechanism for connecting the directory service framework to existing directory services. A set of runtime classes provide "in process" services for objects. For example, the Moniker class is automatically substituted for a client reference when the underlying object instance is streamed or persisted. In accordance with one embodiment, life cycle services are provided by associating a predefined policy with each Moniker object, which policy specifies how and when life cycle services should be performed. Remote objects are then created or bound in accordance with these policies which eliminates the need for the client to directly incorporate life cycle services code into its logic.

36 Claims, 13 Drawing Sheets

METHOD AND APPARATUS FOR PROVIDING PROTOCOL INDEPENDENT NAMING AND LIFE CYCLE SERVICES IN AN OBJECT-ORIENTED SYSTEM

FIELD OF THE INVENTION

The present invention relates, in general, to frameworks for distributed object systems, and, more specifically, to frameworks for providing naming, lifecycle and security services as part of a complete distributed object environment.

BACKGROUND OF THE INVENTION

Software is increasingly becoming a major portion of cost associated with computer systems because it is very "labor-intensive." Some of this cost is due to the effort involved in writing and debugging programs, other costs involve maintaining programs after they have been written. Accordingly, considerable effort has been expended in order to reduce the time and costs involved with writing, debugging and maintaining moderate and large software programs. Much of this effort has been related to developing programming languages and programming techniques which will allow programmers to build on or "reuse" programs and code segments that have been written by others.

Until very recently, software programming was heavily dominated by an approach referred to as "structured programming." Common software programming languages used in this approach were, and remain, BASIC, FORTRAN, and PASCAL. These are considered "higher order" languages that are written in human readable code and ultimately translated into machine or computer readable code by a compiler. Typically, structured programs have consisted of a combination of defined variables of specific data types, e.g. integer, real, and character, and a complimentary set of functions or routines which operate on these variables. Often, a program would include sub-routines which are smaller routines within a program or larger routine that carry out certain operations, e.g. printing data in a given output format. The emphasis to this approach was inputs—functions—outputs and they were often represented as flow-charts by the designers, which logically represented how the program functioned and branched into different functional paths. As an increasing number of programs became large (tens of thousands of lines of code and above) structured programs became increasingly complex and difficult to write, troubleshoot and maintain.

Flowcharts became unwieldy and the tracking of errors through permutations of variables, lengthy code, and a wide variety of program branches was time and cost intensive and often produced less than adequate results. Consequently, a new approach to software programming called Object-Oriented Design (OOD) or Object-Oriented Programming (OOP) emerged and has gained increasing popularity among software developers. OOP promised greater reuse and maintainability than its structured programming predecessor because of an emphasis on well-defined and self contained objects, rather than the structured programming emphasis on a proliferation of relatively loosely-related data manipulating functions and subroutines.

Object Oriented Programming techniques involve the definition, creation, use and destruction of "objects." These objects are software entities comprising data elements, or attributes, and methods, or functions, which manipulate the data elements. The attributes and related methods are treated by the software as an entity and can be created, used and destroyed as if they were a single item. Objects are defined by creating "classes" which are not objects themselves, but which act as templates that instruct the computer how to construct the actual object. A class may, for example, specify the number and type of data variables and the steps involved in the methods which manipulate the object's data.

Object-Oriented Programming languages include C++ and Java, as well as other languages. Each language has an express or implied "object model." Generally speaking, an object model is a unifying set of rules that describe object structure, object life cycle, and inter-object communication. Object structure relates to the physical layout of objects in memory, while object life cycle refers to how applications create and destroy objects. Inter-object communication refers to protocols by which objects communicate with one another. Object models are useful in contexts where all objects in a given system need to conform to a given protocol governing these parameters.

In addition to object-oriented programming languages, code sharing has been facilitated by distributed object systems. In a distributed object system a client object can invoke methods in a server object as if the methods were local to the client object. The server object may be located locally with respect to the client object or may be remote and accessible by a network. Such distributed object systems offered the promise of allowing objects written by different programmers to easily communicate.

However, initially, the promise of reusability and economy of OOP and distributed object systems was not realized. Standards were not in place to insure interoperability of objects or cross-platform interoperability and the proliferation of objects conforming to different object models prevented significant reuse, as originally envisioned. This problem became even more evident when the Internet and the World Wide Web (Web) emerged as widely-used resources and ensured that a wide variety of platform configurations would attempt to access and use commonly-available information on the Internet. As a result, applications designed to operate on the Web used languages designed specifically for the Web, such as hyper-text mark-up language (HTML) as a way to provide a static, but commonly useable, form of coded information while object-oriented programming was applied in other applications. But the problem of cross-platform interoperability persisted and grew as it became more desirous to add dynamic capability to the Web and as many organizations were using multiple platforms and grappling with interoperability internally.

In order to solve these problems, a number of common object models were developed for use with distributed object systems. These models are based on a well-known application programming interface (API), predefined life cycle steps and a homogeneous distributed object model. Such models typically included some type of interface definition language which allows objects written in different languages to have standardized interfaces so that the objects will be able to communicate. Some object models also include predefined mechanisms for transporting communications between remotely-located objects which have interfaces that conform to their specifications. Finally, some object models have also included naming services which allowed client objects to locate server objects when the server objects were located remotely.

Even with such systems the promise of reusability and economy of OOP and distributed object systems has still not been realized because there are a myriad of object models commonly in use, including RMI, CORBA, BOSS, San Francisco, PDO, OpenDoc, COM/DCOM and proprietary object models. There are a further group of persistent store protocols including RDBMS, flat files, ODBMS, ODBC, JDBC, CICS/IMS and proprietary protocols. Finally, there is a proliferation of naming services including LDAP, DNS, X.500, StreetTalk, DCE CDS, URL, Lotus Address Book, Novel NDS, Whois++, SOLO, IDS and various proprietary systems. Therefore, the environment with which client applications and the program developers which develop and support them must work is chaotic.

Consequently, a need exists for a method and apparatus for providing distributed object systems with consistent naming and life cycle policies. A further need exists for providing such services without requiring the users to completely complete their existing systems.

SUMMARY OF THE INVENTION

An inventive method and system provide a framework based Java naming and lifecycle services system. The framework includes a Moniker class which universally identifies an instance of any object model, whether the instance exists or not. Moniker objects instantiated from the Moniker class operate with a set of directory service classes and object adapters to create a directory service framework and a mechanism for connecting the directory service framework to existing directory services. Finally a set of runtime classes provide "in process" services for objects. The Moniker class is automatically substituted for a client reference when the underlying object instance is streamed or persisted.

In accordance with one embodiment, life cycle services are provided by associating a predefined policy with each Moniker object, which policy specifies how and when life cycle services should be performed. Remote objects are then created or bound in accordance with these policies which eliminates the need for the client to directly incorporate life cycle services code into its logic.

BRIEF DESCRIPTION OF THE DRAWINGS

The above and further advantages of the invention may be better understood by referring to the following description in conjunction with the accompanying figures, described below.

DETAILED DESCRIPTION OF THE PREFERRED EMBODIMENT

Figure 1:
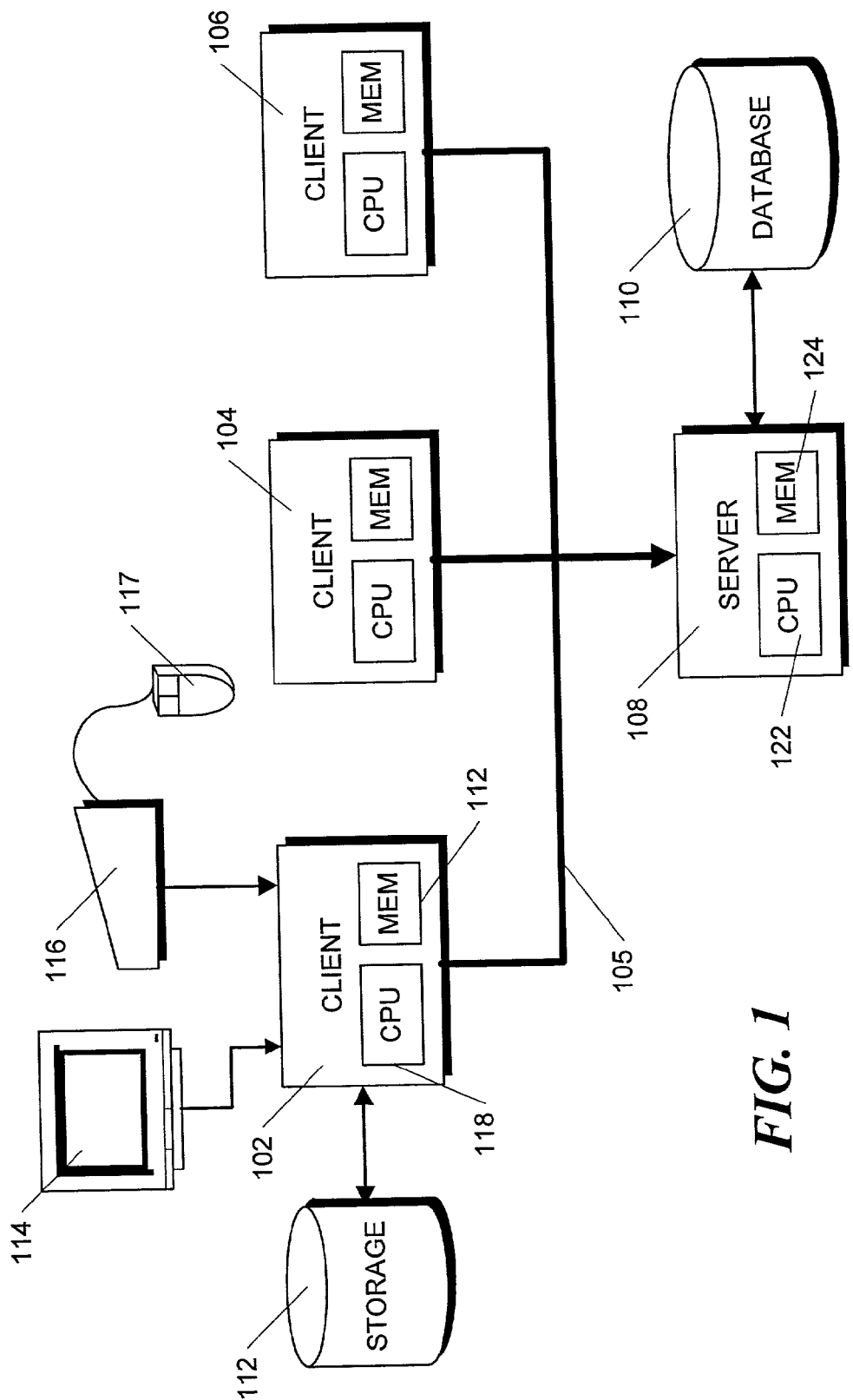
FIG. 1 is a block diagram of a computer system suitable for use with the present invention.

FIG. 1 illustrates the system architecture for a computer system 100 such as an IBM PS/2®, on which the invention may be implemented. The exemplary computer system of FIG. 1 is for descriptive purposes only. Although the description may refer to terms commonly used in describing particular computer systems, such as in IBM PS/2 computer, the description and concepts equally apply to other systems, including systems having architectures dissimilar to FIG. 1.

Computer system 100 includes a central processing unit (CPU) 105, which may be implemented with a conventional microprocessor, a random access memory (RAM) 110 for temporary storage of information, and a read only memory (ROM) 115 for permanent storage of information. A memory controller 120 is provided for controlling RMA 110.

A bus 130 interconnects the components of computer system 100. A bus controller 125 is provided for controlling bus 130. An interrupt controller 135 is used for receiving and processing various interrupt signals from the system components.

Mass storage may be provided by diskette 142, CD ROM 147, or hard drive 152. Data and software may be exchanged with computer system 100 via removable media such as diskette 142 and CD ROM 147. Diskette 142 is insertable into diskette drive 141 which is, in turn, connected to bus 30 by a controller 140. Similarly, CD ROM 147 is insertable into CD ROM drive 146 which is, in turn, connected to bus 130 by controller 145. Hard disk 152 is part of a fixed disk drive 151 which is connected to bus 130 by controller 150.

User input to computer system 100 may be provided by a number of devices. For example, a keyboard 156 and mouse 157 are connected to bus 130 by controller 155. An audio transducer 196, which may act as both a microphone and a speaker, is connected to bus 130 by audio controller 197, as illustrated. It will be obvious to those reasonably skilled in the art that other input devices, such as a pen and/or tabloid may be connected to bus 130 and an appropriate controller and software, as required. DMA controller 160 is provided for performing direct memory access to RAM 110. A visual display is generated by video controller 165 which controls video display 170. Computer system 100 also includes a communications adaptor 190 which allows the system to be interconnected to a local area network (LAN) or a wide area network (WAN), schematically illustrated by bus 191 and network 195.

Operation of computer system 100 is generally controlled and coordinated by operating system software, such as the OS/2® operating system, available from International Business Machines Corporation, Austin, Tex. The operating system controls allocation of system resources and performs tasks such as processing scheduling, memory management, networking, and I/O services, among other things.

The Java programming language is rapidly emerging as the preferred OOP language for Internet and cross platform use because Java programs consist of bytecodes, which are architecture and operating system independent and can be sent over the Internet and other networks. The bytecode is actually executed on a particular platform by means of a "virtual machine" (VM) which allows a Java program to be run on any platform, regardless of whether the Java program was developed on, or for, the particular platform which attempts to run the Java program. Java bytecodes which arrive at the executing machine are interpreted and executed by the embedded VM.

A complete Java program is known as an application, while a segment of Java code, which does not amount to a full application, but is reusable, is referred to as an "applet". Java also includes a component model where a component is a self-contained object with a predefined interface. A component within Java is referred to as a "bean," and includes such a defined interface. Java beans are used within applets and applications and a programmer need not know the internal structure of the Java bean to use it, he need only know the interface. In addition, once the interface of a bean is known, a programmer can create a new customized component from the base Java bean component. The Java bean contains properties and methods, which can be changed when another bean is derived created from the bean, which is how customization of the new component is achieved.

Since Java is well-suited to operation over networks, the following description of the illustrative embodiment is directed toward the Java programming language. However, it will be obvious to those skilled in the art that the invention could be implemented for other OOP languages as well, e.g. C++.

Figure 2:
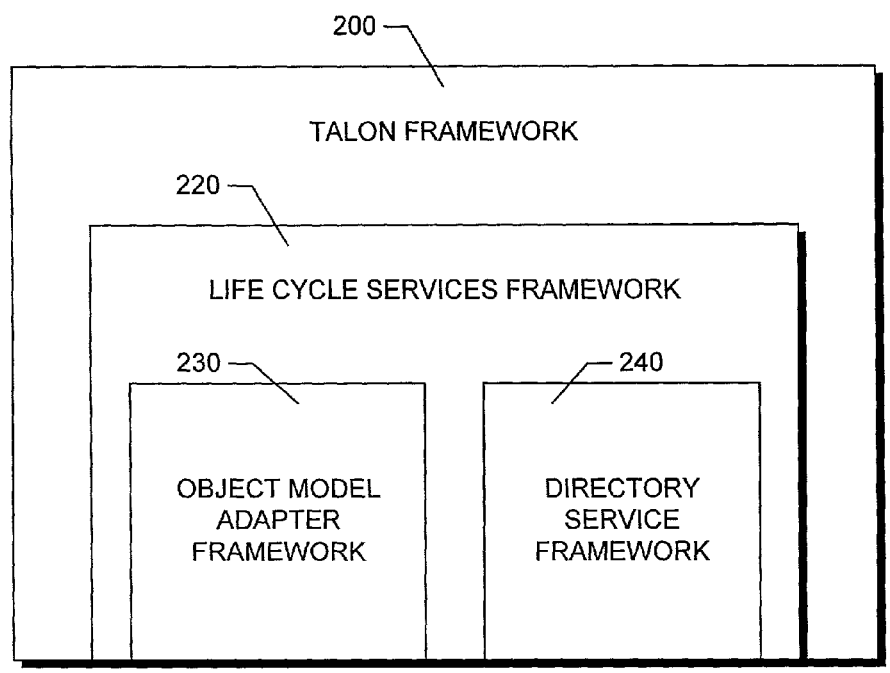
FIG. 2 is a block schematic diagram of the framework structure of an illustrative embodiment.

FIG. 2 shows an overview of an illustrative naming and life cycle services framework, 200, constructed in accordance with the principles of the present invention and applicable to distributed object-oriented programming systems, which typically include an architecture that has a client side and a server side. The framework 200 includes a life cycle services framework 220 and a development kit 210 which incorporates the naming service classes. The life cycle services framework 220, in turn, includes an object model adapter framework 230 and a directory services framework 240. The framework 220 and kit 210 exist to provide basic services which facilitate the building and incorporation of new object models and provide naming services, directory services and life cycle system services and are described more fully below.

Figure 3:
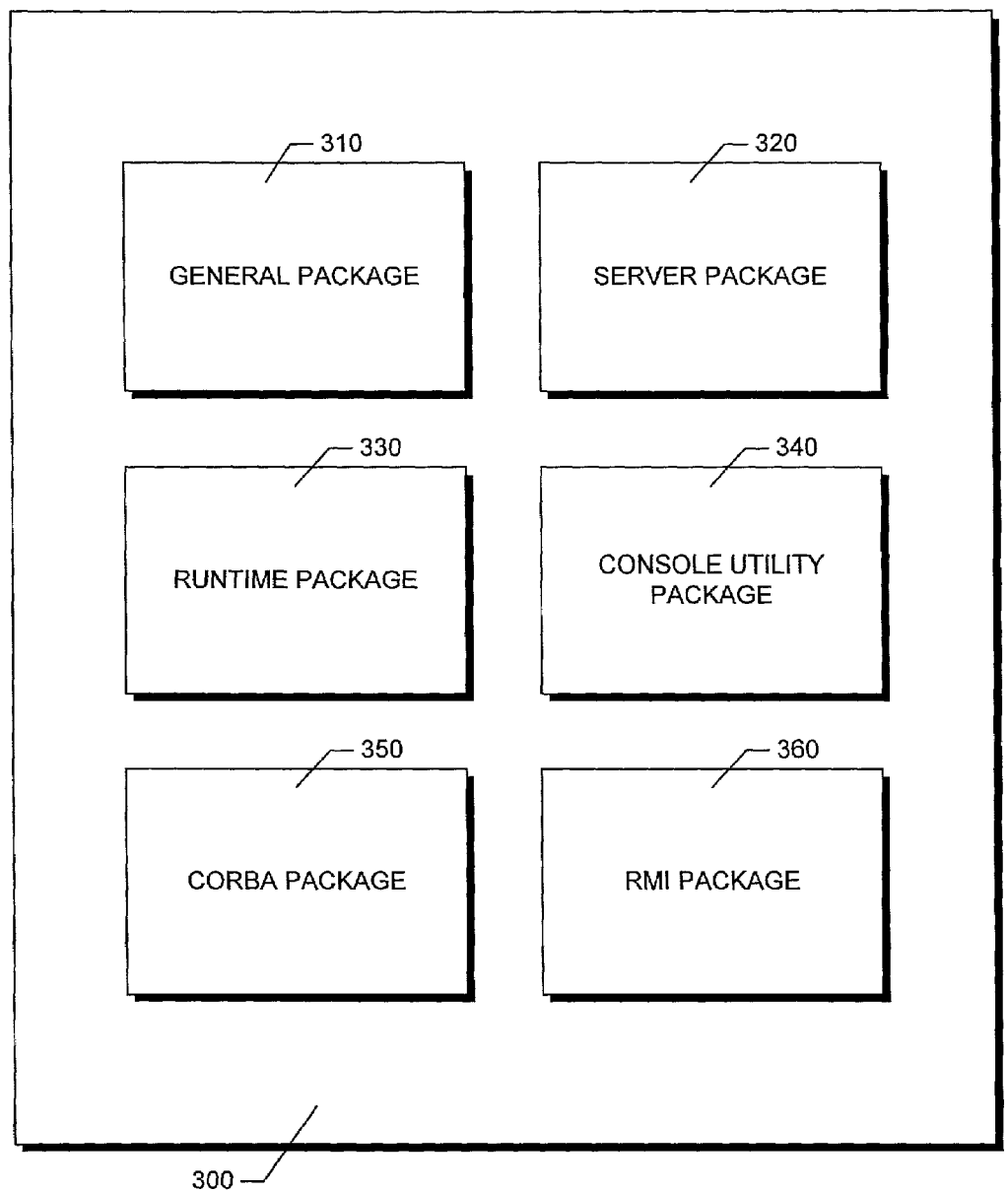
FIG. 3 is a block schematic diagram of an illustrative development kit showing the code packages therein and incorporating features of the present invention.

Referring to FIG. 3, the development kit 210 is illustrated in greater detail and includes several software packages. In accordance with conventional Java program organization, these packages include both interfaces and implementation classes. The interfaces are classes which include methods used to define the syntax an object must implement in order to ensure compatibility of the object with other relevant methods. Some interfaces and implementation classes are only used on the server side while other interfaces and classes may be used on either the client or server sides. More specifically, the development kit 300 includes an object handling package 310, a server package 320, a runtime package 330, a console utility package 340, a CORBA package 350, and an RMI package 360. Each package is discussed more fully below.

Figure 4:
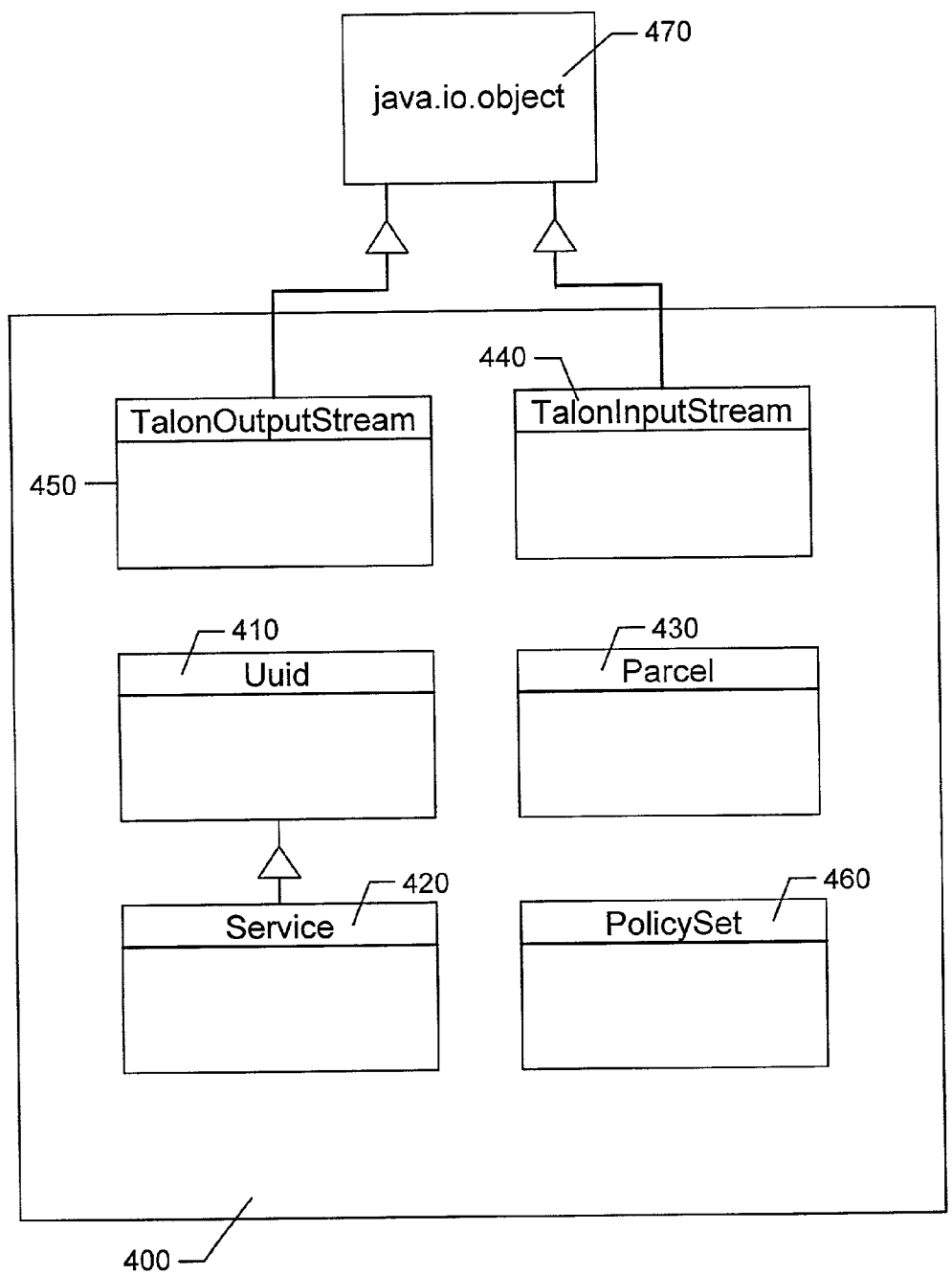
FIG. 4 is a block schematic diagram of classes in an object handling code package of the illustrative embodiment.

Referring to FIG. 4, the individual classes of the object handling package 400 (illustrated as 310 in FIG. 3) are shown. The Uuid class 410 includes a method which provides a unique identification number for each instance of an object. This unique identification number is used internally by the inventive framework in order to track a particular instance of an object over its lifetime. A method within the Uuid class 410 creates the unique identification number using a random number generator which is seeded with a date and time at which the instance is created.

The Service class 420 is a subclass of the Uuid class 410 and includes a method which, instead of providing a unique identification number, provides a "well-known" identification number which is used to identify a "known" service related to an object, such as an Internet phone book service. Such a "well-known" ID is available and known by typical users and the service is one which is standard within the framework and available to users.

The Parcel class 430 encapsulates associations between moniker objects, instances of the inventive framework, and objects. In accordance with the principles of the invention, moniker objects are lightweight shells of an actual object and, therefore, are always associated with an object. The moniker objects are discussed in greater detail below and are substituted for instances or references to an actual object in streaming and persistence operations, thereby allowing additional services, such as life cycle services to be associated with the object. Framework instances, as opposed to the framework itself, are running instances of the framework 200. Methods within the Parcel class 430 track these associations in a client-side virtual machine. The preferred method for locating an object with the inventive system is to retrieve an associated parcel object.

The OutputStream class 450 is derived from the java.io.object.OutputStream class in the standard java.io.object library 470 and is used in lieu of the parent Java class any time that an object is streamed-out. In accordance with the principles of the present invention, when the OutputStream class is used and an object is encountered in the stream, a related moniker object is substituted for the actual object in the stream.

The InputStream class 440 is also derived from the java.io.object.InputStream class in the standard java.io.object library 470 and is used in lieu of the parent Java class when data is to be streamed-in which data was originally streamed-out by the OutputStream class 450. During a streaming-in process using the InputStream class 440, any moniker object encountered in the stream is resolved to find the actual object which is then substituted within the stream for the moniker object The PolicySet class 460 is used to provide life cycle services for moniker objects and contains a predetermined, enumerated set of specific life cycle services which can be applied to a particular instance of an object over the lifetime of that object. Associating specific policies with an object is done by specifying the policies or rules to use when creating, locating, persisting, resurrecting, destroying, and copying objects via the inventive framework. These policies are stored in the PolicySet object and are set when an object is created and are represented by defined Boolean constants. Each constant can be "on" or "off", as follows;

| Policy | On | Off |
|---|---|---|
| a) kCreate | Create new instance. | Resurrect persisted object. |
| b) kUseMoniker | Use existing moniker. | Create a new moniker. |
| c) kKeep | Keep persistent storage after resurrection. | Delete persistent storage after resurrection. |
| d) kResStationary | Use stationary storage. | Use storage located by moniker. |
| e) kPersist | Persist immediately before returning from moniker resolve method. | Do not persist immediately |
| f) kPerAtShutdown | Persist at shutdown. | Do not persist at Shutdown. |
| g) kPerUnreferenced | Persist when no longer referenced. | Do not persist when no longer referenced. |
| h) kDisAtShutdown | Delete all storage at at shutdown. | Do not delete all storage at shutdown. |
| i) kLog | Log each transaction. | Do not log each transaction. |
| j) kRtUnreferenced | Delete from memory when no longer referenced. | Keep alive even if no longer referenced. |
| k) kCopy | Return an object copy. | Return the object itself. |

The PolicySet object is then associated with the moniker object for an instance in order to set the lifecycle policies for that instance.

Figure 5:
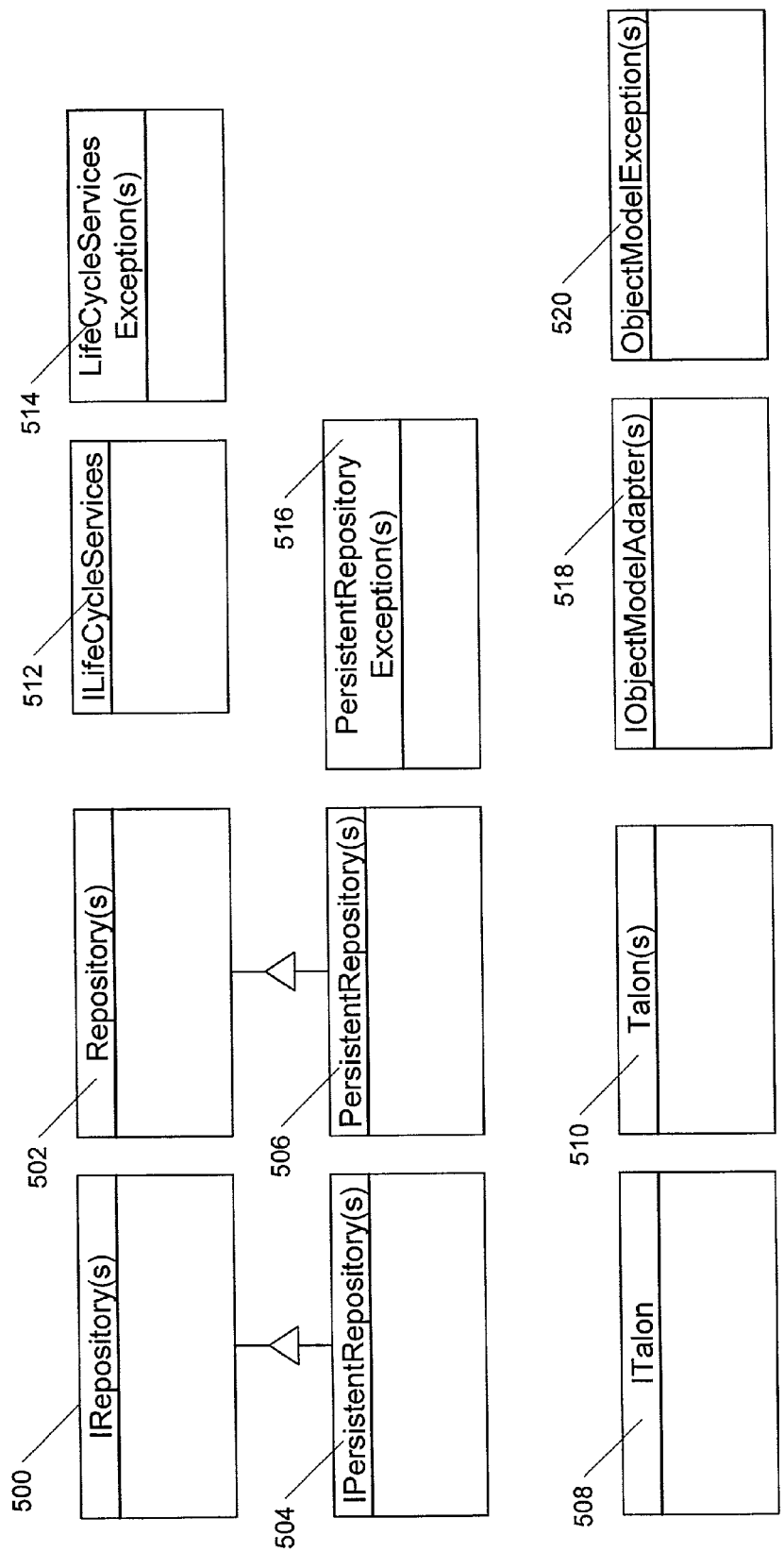
FIG. 5 is a block schematic diagram of classes in a server package of the illustrative embodiment.

Referring to FIG. 5, the server package 500 (also referred to as 320 in FIG. 3) is decomposed into its interface and implementation classes. Interface names and implementation class names appended with an "(s)" in the figure reside only on the server side. Many of the classes and interfaces in this package deal with providing object persistence. When an object is "persisted", it is saved at a place in memory, e.g. a file system, an object store, etc. The portion of memory where it is saved is called a "repository". The repository may be a runtime repository, for example, if the storage is RAM, or a persistent repository if the storage is persistent, for example, disk storage.

The IRepository interface 510 defines four methods which indicate the responsibilities of a repository, whether persistent or runtime. These methods perform the following functions:

a) add an object-moniker association, by creating a "moniker key" which serves as an index value used to locate the actual object,
b) remove an object-moniker association by deleting the moniker key,
c) fetch an object using its moniker key, and
d) shut down the repository.

The Repository(s) class 515 implements the methods of the IRepository interface 510 to accomplish persistence.

The IPersistentRepository(s) interface 505 extends the IRepository(s) interface 510 and serves as a marker for other adapter classes which support persistence in the inventive development framework. Interface 505 is implemented by the PersistentRepository(s) class 525 which extends the Repository(s) class 515. PersistentRepository(s) class 525 uses the "local" file system to persist the state of a remote object implementing an interface which operates with a transport mechanism. Objects are persisted in a directory structure reflective of the name of the package to which the class belongs. This package-related directory is also related to the root directory of a repository, so that multiple repositories can be simultaneously operational.

The PersistentRepositoryException(s) server side class 530 includes methods which throw an exception when problems arise with the methods involved in storing, deleting, or retrieving objects instantiated from the PersistentRepository(s) class 525.

The ILifeCycleServices(s) server side interface 540 and its implementation LifeCycleServices(s) class 545 provide runtime and persistent store life cycle services. These classes are used to abstract the source and type of an object as well as the services which will manage the object. This abstraction is required in order to enable the use of different object models such as Java, RMI or CORBA. Classes 540 and 545 hide the miscellaneous methods in the framework class 520 from implementations used in the object model adapter. The methods defined in the llifeCycleServices(s) interface 540 add and fetch framework-managed instances of a particular object model adapter.

IObjectModelAdaptor(s) 545 is a server side interface and ObjectModelAdaptor(s) 547 is an implementation class which orchestrates the scheduling of life cycle services and most intricacies of a particular object model, such as RMI or CORBA. Its only method is used to fetch a Parcel object using the object's moniker and an implementation of the IlifeCycleServices(s) interface associated with the object. The LifeCycleServicesException(s) class 550 includes methods which throw an exception when an error providing life cycle services occurs. Finally the ObjectModelException(s) class 555 includes methods which throw an exception when an error occurs during execution of an object model adapter instantiated from class 547.

The Talon(s) interface 520 provides several methods which the Talon(s) class 535 implements. These methods include methods for performing the following operations:

a) fetch a parcel object using a moniker as a key,
b) get the name of a running instance of the inventive framework,
c) get the registry location of a running instance of the inventive framework, and
d) shut down of a running instance of the framework.

The Talon(s) class is designed as a framework which provides various services provided by "plug-in" modules. These services include a persistent repository, a runtime repository, an object model adapter and a security manager. The Talon(s) server side class 535 also provides life cycle services and policies implemented by the classes outlined above.

Figure 6:
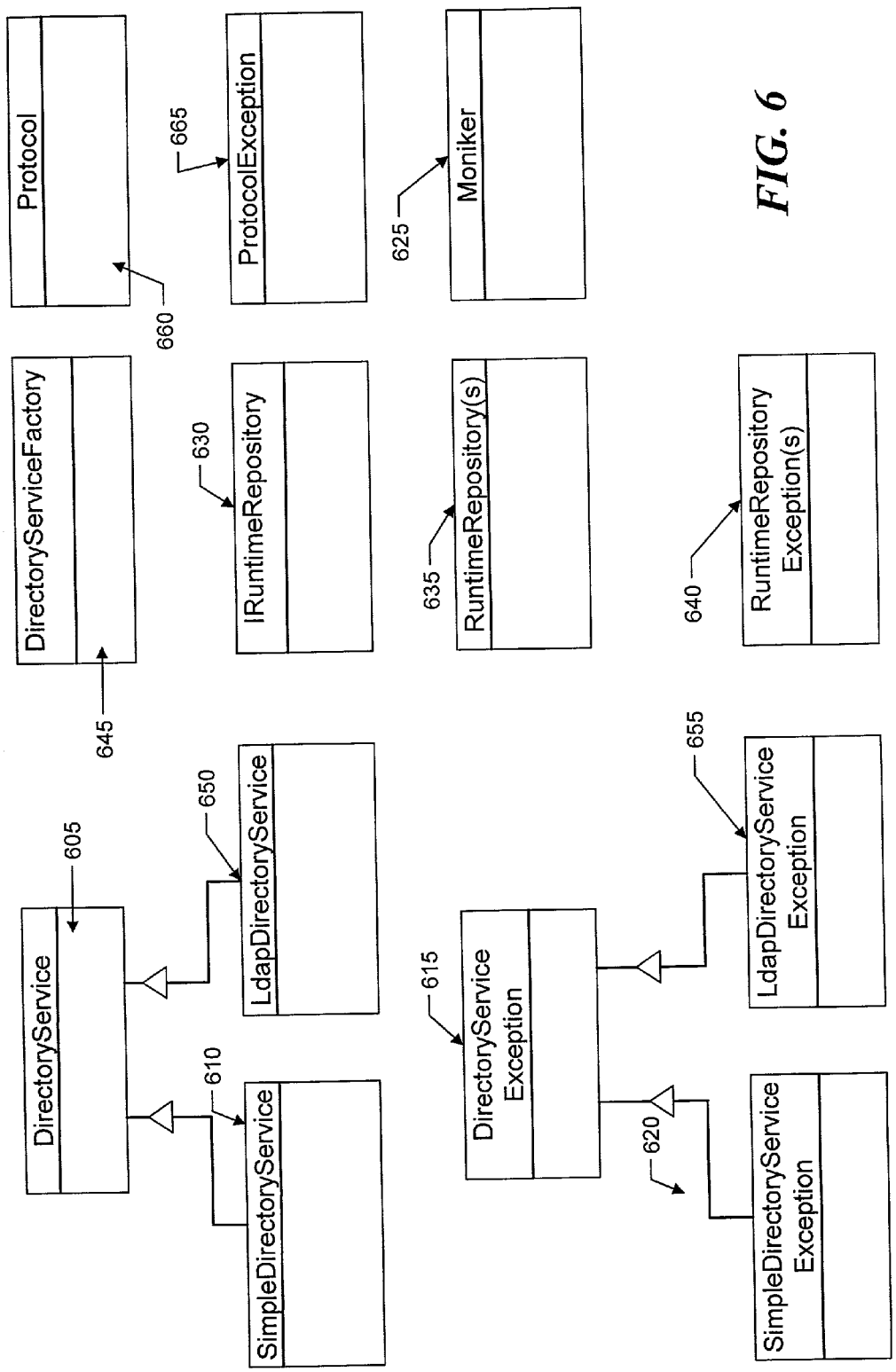
FIG. 6 is a block schematic diagram of classes in a runtime package of the illustrative embodiment.

Referring to FIG. 6 of the illustrative embodiment, the runtime package 600, (referred to as package 330 in FIG. 3) is further decomposed into its classes and interfaces. These classes are put into the runtime package for the most part to take advantage of the well-known "package private" construct in the Java language which allows related code to operate together more closely and efficiently. The DirectoryService class 605 is an abstract class which provides the entry point into conventional directory service adapters and is generally used by the moniker class 625 to locate an object. The DirectoryService class 605 allows the look-up of an object, based on a moniker, and can also be used to export an object to the directory space. The DirectoryServiceException class 615 contains methods which provide an indication when some form of an exception has occurred in the execution of methods in the DirectoryService class 605.

The Moniker class 625 identifies an instance of a class and includes information about the class, such as whether it currently exists or not, in a universal manner. Instances of the Moniker class 625 include:

a) the framework name,
b) the name of the associated class (the resource name), c) information identifying a policy set to use for life cycle services,
d) an identification number provided by the Uuid class,
e) a hash code method,
f) an "equals" method, and
g) an implementation of the directory service.

The framework name identifies the life cycle services adapter used for the moniker and associated object. The policy set associated with an object specifies the relevant life cycle services or policies invoked. The identification number identifies a unique instance of an object or, in the case of a service class, it identifies a well-known service or policy, such as the logging policy, which is controlled by the defined constant kLog, as described above. Finally, the directory service implementation allows the moniker object to resolve itself by implementing a resolve( ) method of the moniker class. The resolve( ) method within the moniker class 625 fetches the object associated with the moniker using a specified directory service and replaces the moniker with the object. The moniker object can be adapted to use any existing directory service and to address any namespace.

If the directory services of the moniker object have not been specified, i.e. policies have not been turned "on", then there are no policies or services associated with the moniker object. In that case, the resolve( ) method will attempt to use default directory services, which are specified in the abstract DirectoryService class 605. If the default directory services are not set, an exception will be thrown.

When a moniker object is serialized, or marshaled, the directory services are also serialized-out, along with the development framework name, policy set, and Uuid identification number. If the directory services have not been set during the serialization-out process of the moniker object, but the default directory services are set, the default directory services will be substituted during serialization-out process. However, regardless of which services were serialized, the moniker uses whichever it finds in the serialized stream during the serialization-in, or unmarshaling, process and sets it as the directory services for that particular moniker instance.

A hash code method, also in the Moniker class 625, which is conventionally used for identifying objects, always returns a zero when used, since the Uuid class provides the actual identification of the object, therefore, in order to determine whether two moniker objects are equal, the identification number included in moniker objects is compared by the "equals" method.

Directory service adapters which are used with moniker objects are generated by subclasses of the DirectoryService class 605. For example, the SimpleDirectoryService class 610 is a sub-class of the DirectoryService class 605 and is used as the RMI directory service adapter. It is used in conjunction with the Server Package RMIObjectModel-Adaptor class (illustrated as class 910 in FIG. 9.) The SimpleDirectoryService class 610 includes methods to perform a simple look-up of the named development framework class and to fetch information from the framework, via RMI-compatible calls. The SimpleDirectoryServiceException class 620 is a sub-class of the DirectoryServiceException 615 and includes a method which throws an exception when an error condition occurs in the execution of a simple directory service object created from the SimpleDirectoryService class 610.

The LdapDirectoryService class 650 is a sub-class of the DirectoryService class 605 which adapts a moniker object to use the LDAP directory service. The LdapDirectoryServiceException class 655 includes a method to throw an exception when an error condition has occurred in the execution of an LDAP directory service object created from the LDAP directory service adapter object.

The IRuntimeRepository interface 630 extends the IRepository interface (interface 510 in FIG. 5) and adds methods for fetching a moniker object from the repository using an object as a key, as well as copying moniker-object associations to another IRepository in order to duplicate them. The RuntimeRepository class 635 is an implementation of the IRuntimeRepository interface 630 and includes methods to track the runtime associations of moniker-object pairs. When an object is added to a runtime repository created from class 635, the object uses the directory service implementation included with the moniker object which is associated with the object to export the object to that directory service. The RuntimeRepositoryException class 640 includes a method which throws an exception when an error condition in the runtime repository occurs.

Figure 7:
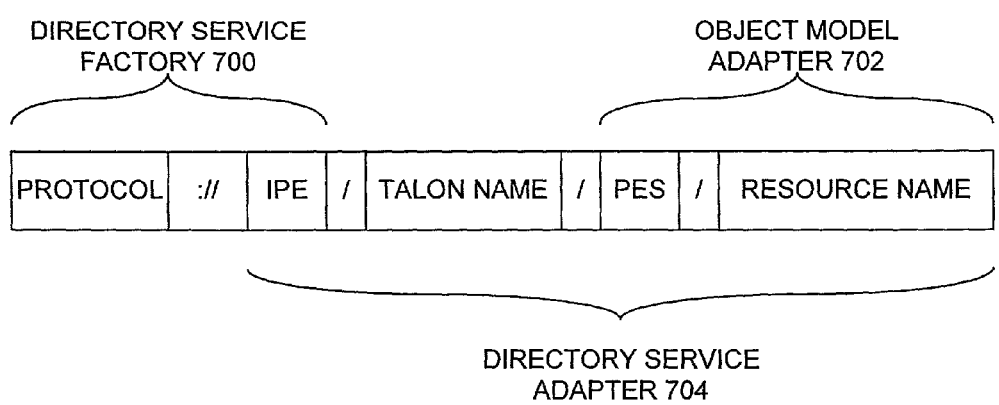
FIG. 7 is a schematic diagram illustrating a uniform naming scheme for moniker objects and depicting how the name is processed to locate a resource.

DirectoryServiceFactory class 645 is a concrete class which contains a method that locates and creates directory service adapters from the above classes, using a moniker object uniform resource locator ("URL" which is illustrated in FIG. 7.) For example, given a moniker object URL of "ldap:\\super.com:80\ . . . ", the DirectoryServiceFactory class method creates a directory service adapter for the moniker object using the following steps:

a) parse the URL to extract the directory service protocol identifier before the delimiter "//:" and capitalize the first letter. In the example above, "ldap", would be extracted and capitalized to create a new string "Ldap",
b) concatenate the string "DirectoryService" to the new string to produce the string: "LdapDirectoryService",
c) search for the class having this string as its name in the runtime package 800 and the protocol class 660, and
d) if the class is located, fire its constructor which takes a single string as its only parameter and pass the next section of the URL (called an initial point of entry or "IPE") as that string. In the above example the string "super.com:80" would be passed to the constructor of the located directory service class. If the class is not located, throw an exception.

This implementation simplifies the creation of adapters, minimizes the code that a client must create in order to begin to use the inventive framework and alleviates any need to hard code class declarations in client's code or some type of runtime registry mechanism.

The Protocol class 660 contains methods responsible for parsing the moniker URL text string into the directory service type, IPE, protocol elements, policy set, resource name, and Uuid identifier or service identification number. The ProtocolException class 665 contains a method which throws an exception when a problem occurs parsing the URL string.

As mentioned above, the moniker addresses a namespace by means of a uniform naming scheme which divides the responsibilities for locating an object between the inventive framework and the directory service which manages the namespace. The format for a uniform resource locator (URL) namespace addressing scheme for a Moniker class 625 in accordance with the illustrative embodiment and which identifies an instance of a class for any object model, is shown in FIG. 7. Each item, i.e. the protocol, initial point of entry (IPE), framework name, protocol elements (PEs), and the resource name, is referred to as a "unit." Units are separated by a unit separator which illustratively may be the "/" character or the "://" character string. The protocol unit is a case-sensitive alphanumeric string which identifies the directory service protocol to be used, e.g. Lightweight Directory Access Protocol (LDAP).

IPEs are alphanumeric strings separated by colons which follow well-known Internet-based naming conventions, e.g "www.taligent.com:80." Here, "www.taligent.com" indicates the relevant machine or server, while "80" indicates the port on the machine. The development framework name is a case-sensitive character string based on the name of the server being accessed, e.g. "Places." The PEs are key-value pairs of alphanumeric strings where the key and value(s) are separated by an equal sign and multiple values are separated by commas, e.g. "Presidents=Clinton, Bush, Reagan" or "dn=Library." The resource names are alphanumeric strings which, in the case of Java classes, follow standard naming conventions and identify an instance of a class, e.g. foo.bar.Library. For example, using the "Simple" directory service protocol, described herein, the following URL might be possible:

simple://www.taligent.com:80/Places/dn=Library/ foo.bar. Library where the units are described above. Alternatively, the URL could be written:

simple://Places//foo.bar.Library which will provide a new instance of foo.bar.Library class from the development framework class named "Places" which is first found. Finally, the URL can be extended to provide more information about the object requested, such as:
simple://www.taligent.com:80/Places/ uid=3b961cb8002fd221/ps=kCreate, kPersist,kLog/ foo.bar.Library which includes the Uuid identification number and associated services, described in more detail below.

FIG. 7 also depicts how the responsibility of the framework naming is partitioned among a directory service factory 645, directory service adapters created by the factory, and object model adapters. Note that the protocol and IPE are used by the directory service factory to create the directory service adaptor and the directory service adaptor, in conjunction with the object model adaptor, then uses the remainder of the URL to resolve the name and locate the resource with which the moniker object is associated.

Figure 8:
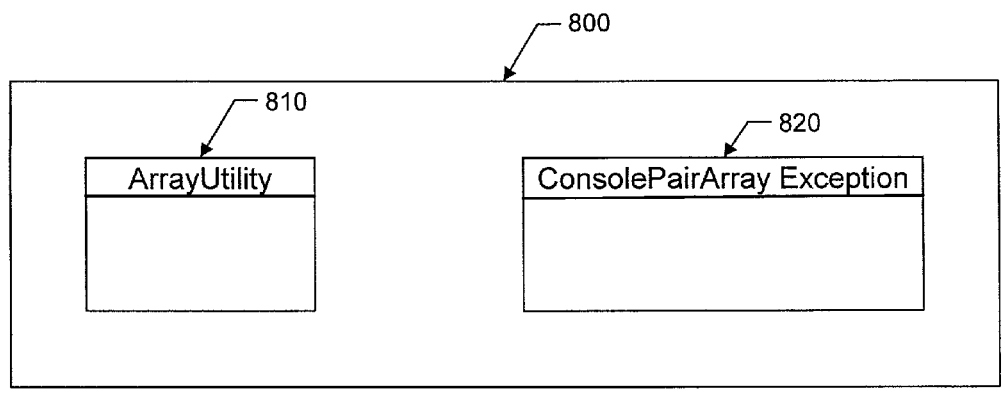
FIG. 8 is a block schematic diagram of classes in a console utility package of the illustrative embodiment.

Referring to FIG. 8, the Console Utility package 800 (also illustrated as package 340 in FIG. 3), is comprised of two classes. The ArrayUtility class 810 and the ConsolePairArrayException class 820 are used to perform search and enumeration tasks upon arrays, as well as to parse command line flags at the command prompt. The ArrayUtility class 810 has two methods. The first method tests for the existence and possible position of an object in a array of objects. The second method takes an array of keys and produces a hash table wherein the keys are strings prefixed with a hyphen and the values are the strings which immediately follow such hyphen prefixed strings. For example, if an array of {"–1", "–2", "value 2", "–3", "value 3"} is the input, the hash table {key="–1" value=" "; key="–2" value="value 2"; key="–3" value="value 3"} is the output. These keys are used by clients to locate values which represent command line arguments. The ConsolePairArrayException class 820 contains a method which throws an exception when an error occurs while parsing an array of keys according to the second method described above, namely CreateFromConsolePair(string ARGS ▢).

Figure 9:
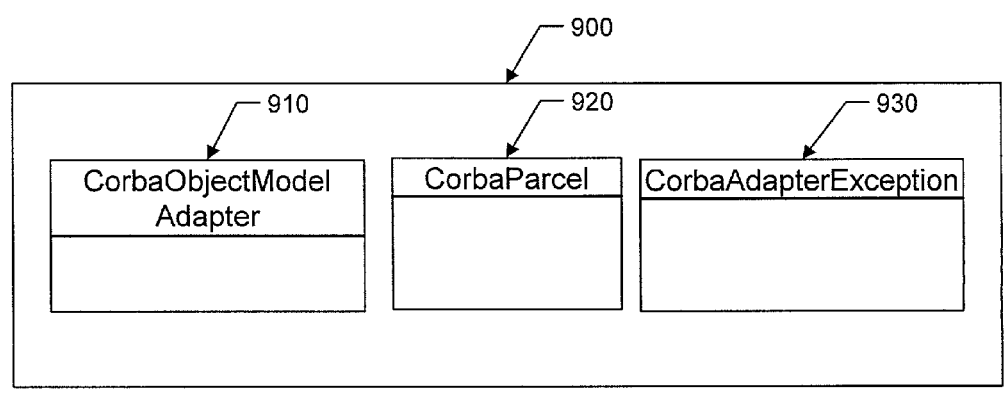
FIG. 9 is a block schematic diagram of classes in a CORBA package of the illustrative embodiment.

Referring to FIG. 9, the CORBA package 900 (also referred to as package 350 in FIG. 3) is decomposed into its classes. These classes include the CORBAObjectModelAdaptor class 910, which creates a CORBA adapter that allows use of CORBA compliant code with the inventive development framework. The CORBAParcel class 920 contains methods which allow objects created from the CORBAObjectModelAdaptor class 910 to transfer binding logic code to the client, which preserves the properties of CORBA compliant objects. The CORBAParcel class 920 include methods which parallel those of the Parcel class 430 (FIG. 4.) The CORBAAdaptorException 930 class includes a method which throws an exception when an error occurs using the CORBAObjectModelAdaptor class 910 or objects created therefrom.

Figure 10:
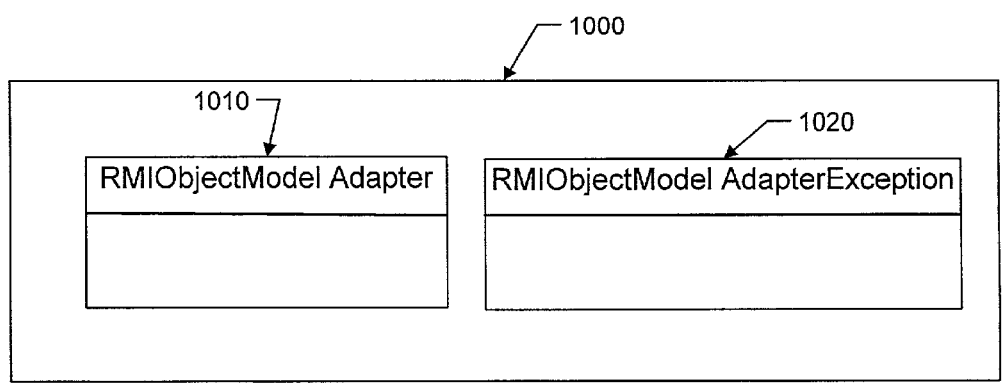
FIG. 10 is a block schematic diagram of classes in an RMI package of the illustrative embodiment.

Referring to FIG. 10, the RMI package 1000 (also referred to as package 360 in FIG. 3) is further decomposed into its classes. The classes in this package relate to the RMIObjectModelAdapter 1010. The RMIObjectModelAdapter class 1010 creates a RMI adapter object, which allows use of RMI compliant code with the development framework. In particular, the RMIObjectModelAdaptor class 1010 encapsulates the basic services of an RMI Adapter. When asked for an instance of a particular class, via a moniker object, this adapter first checks the LifeCycleServices object for such an instance or service. If a reference is found, the object created from the RMIObjectModelAdapter class 1010 includes a method which returns the reference. If no reference or instance is being managed by LifeCycleServices object, the RMI adapter object uses the class name, indicated by the resource name of the moniker, to locate and instantiate the remote RMI class. If, by adhering to the properties of the given moniker, the adapter object is able to create a manageable RMI object, the adapter adds the RMI object to the LifeCycleServices object and then returns the reference to the requester of the RMI object. If an error occurs when trying to locate or create an RMI object, an object created from the RMIObjectModelAdapterException class 1020 will include a method which throws an exception.

Figure 11:
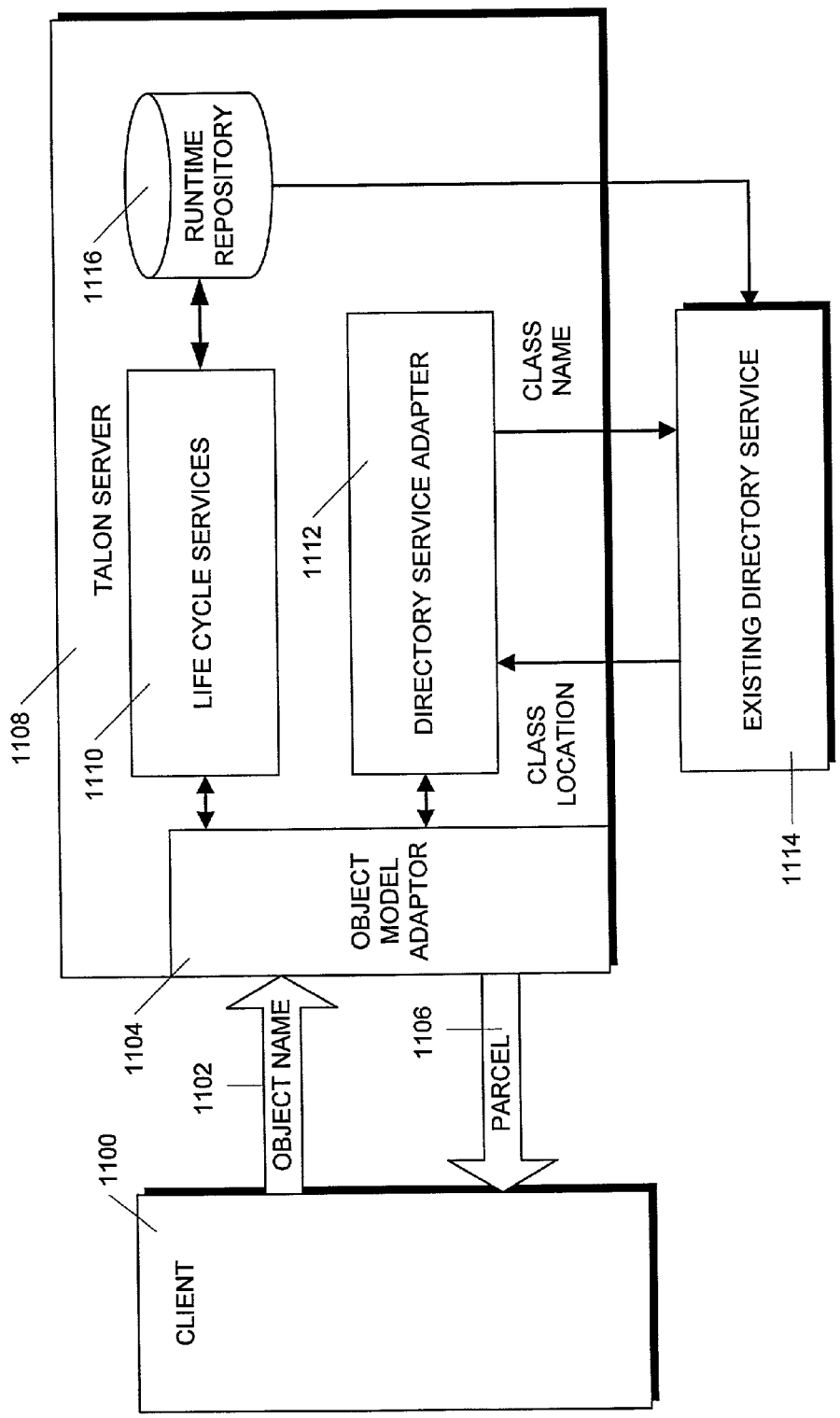
FIG. 11 is a schematic diagram illustrating the location or creation of an object using the illustrative framework system.
Figure 12:
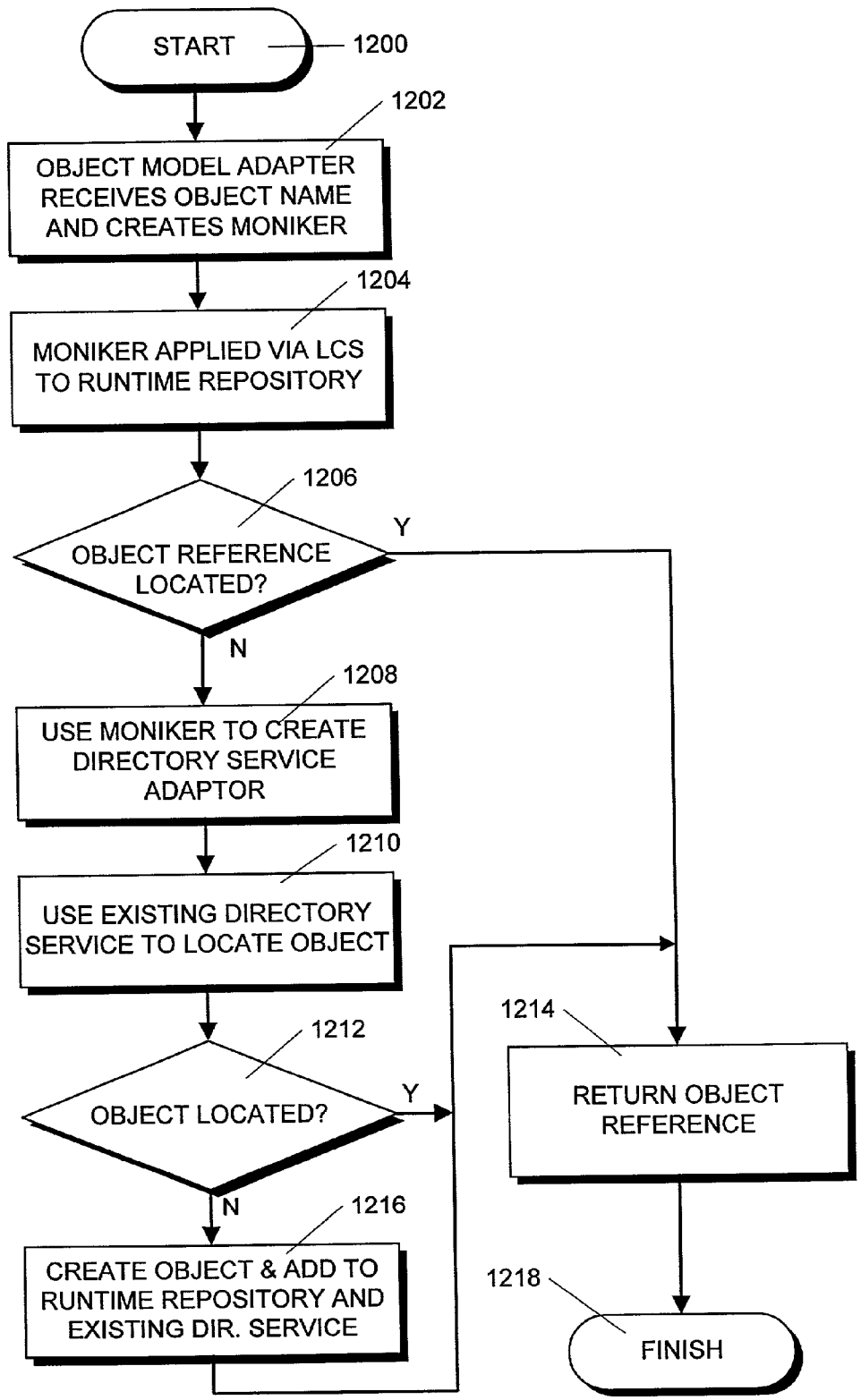
FIG. 12 is a functional flow diagram of the method used in the location operation of FIG. 11.

FIG. 11 illustrates schematically the steps involved when a client requests that an instance of an object be located using the life cycle services system of the present invention. The steps in this process are also outlined in detail in FIG. 12. In FIG. 11, the request for an object instance begins when the client 1100 forwards a request, including the object name, for the instance to the Talon server 1108 as indicated by schematically by arrow 1102. This request is received by the object model adapter 1104 in the Talon server 1108. The object location process is illustrated in detail in the flow chart of FIG. 12 and starts in step 1200. The process proceeds to step 1202 in which the object model adapter receives the object name and instantiates a corresponding moniker object from the Moniker class which is described above.

Next, the object model adapter 1104 uses a life cycle services object 1110 in the Talon server 1108 to apply the moniker object name to the runtime repository 1116 as indicated in step 1204. As previously mentioned, runtime repository 1116 contains a database of moniker name-object reference pairs. Using the moniker name supplied by the life cycle services object 1110, the runtime repository 1116 attempts to locate the associated object reference as indicated in step 1206. If an object reference is located, it is returned to the client 1100 in a parcel object 1106 as recited in step 1214 and the process ends in step 1218.

Alternatively, if, in step 1206, an object reference is not located in the runtime repository 1116, the process proceeds to step 1208 in which the object model adapter 1104 uses the moniker object to create a directory service adapter 1112 by means of the directory service factory object previously described.

The directory service adapter 1112 then applies the object name to an existing directory service 1114 and, in step 1210, the existing directory service is used to locate either the object or the class information for instantiating the object.

If, in step 1212, the object is located then in step 1214 an object reference is returned to the client 1100 by means of the directory service adapter 1112 and the object model adapter 1104. As before, the object reference is returned in a parcel object as indicated in arrow 1106.

Alternatively, if, in step 1212, the object is not located, then, in step 1216, the object model adapter 1104 uses the location of the class information retrieved from the existing directory service 1112 together with the life cycle services object 1110 to create the object and add references to the instance to the runtime repository 1116. The runtime repository 1116 then adds the object reference to the existing directory service 1114 as indicated in step 1216. Finally, the object reference is returned in step 1214 and the process ends in step 1218.

Figure 13:
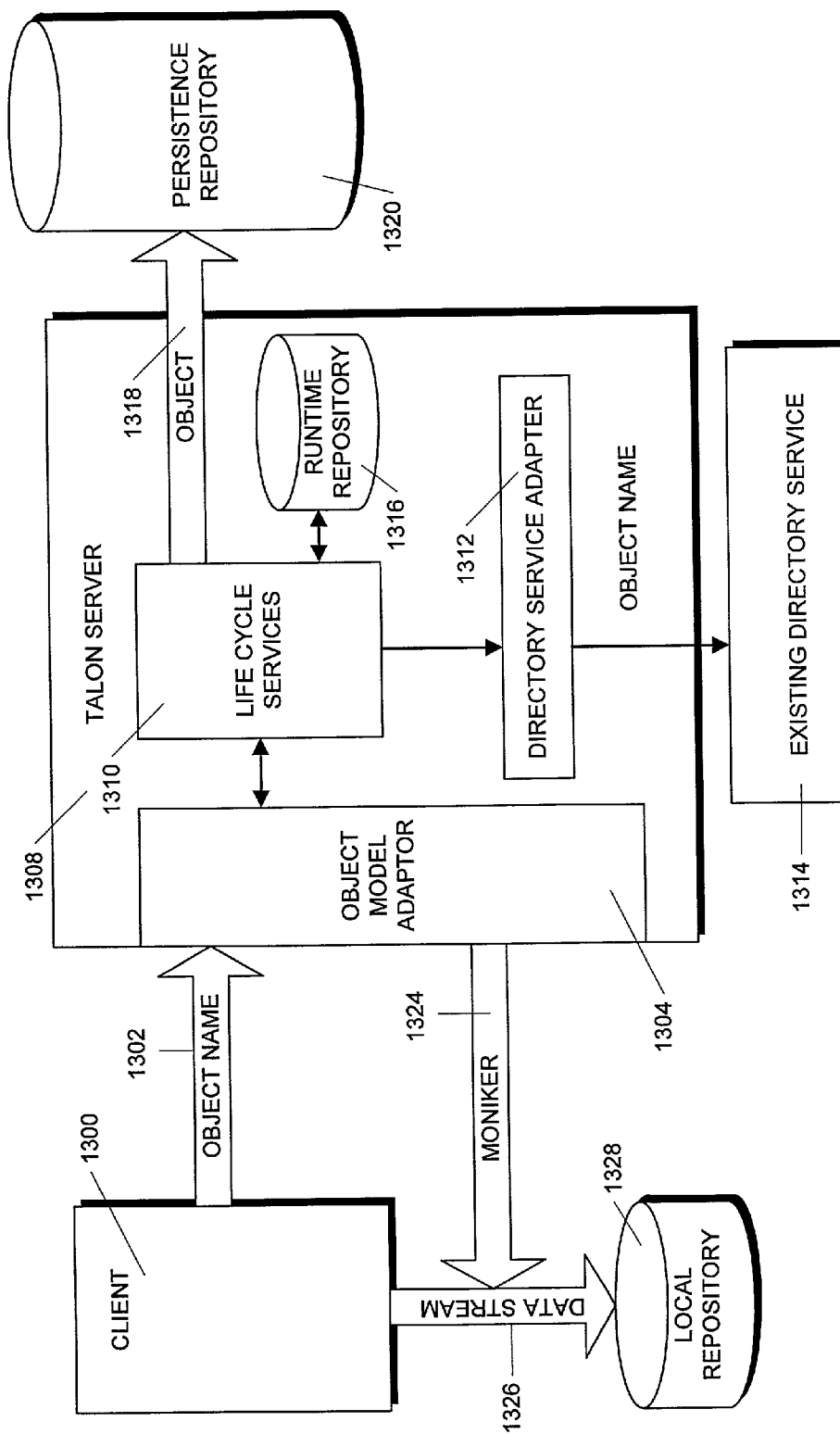
FIG. 13 is a schematic diagram illustrating the persisting of an object using the illustrative framework system.
Figure 14:
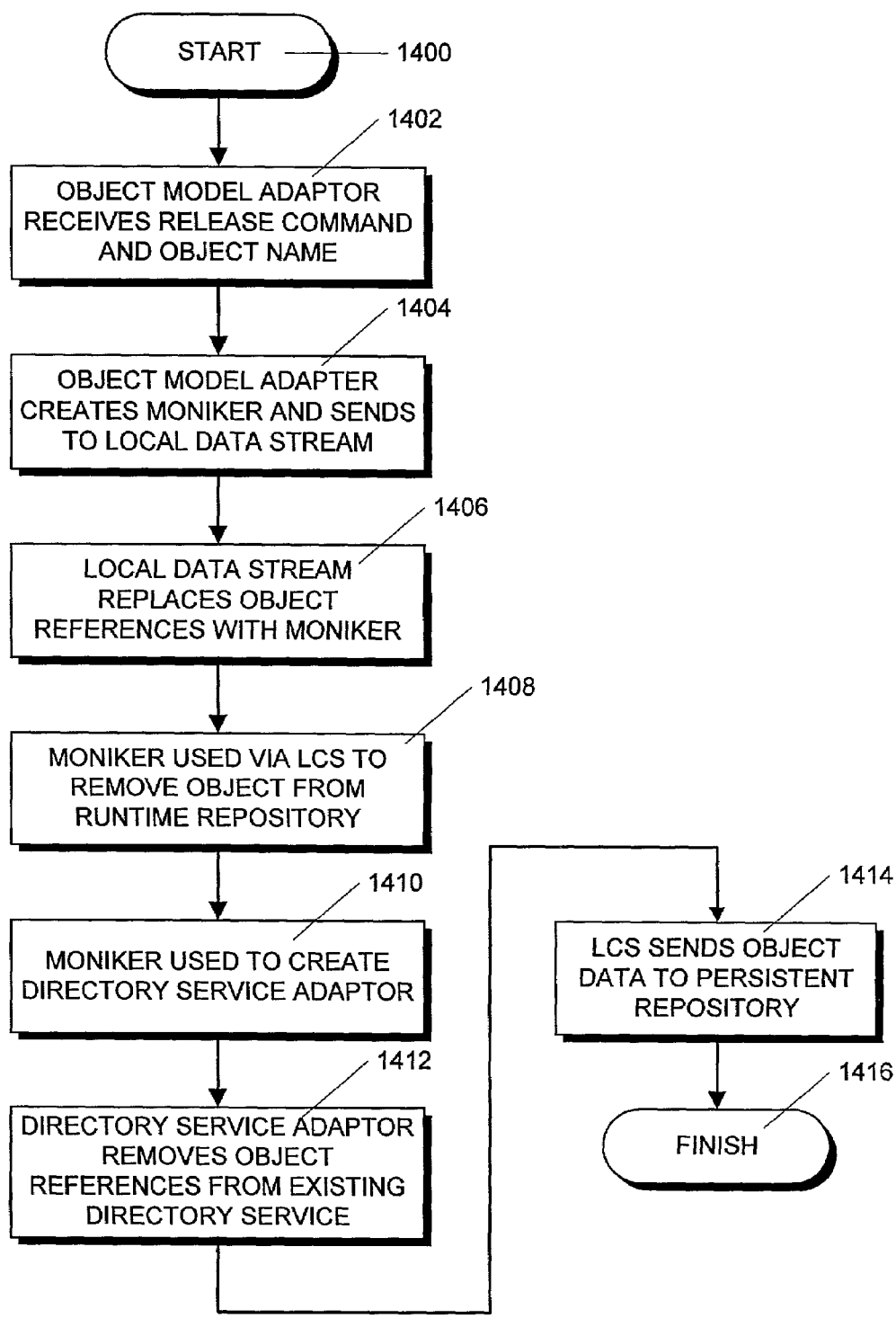
FIG. 14 is a functional flow diagram of the method used in the persisting operation of FIG. 13.

FIGS. 13 and 14 illustrate the objects and steps performed in persisting an object utilizing the inventive life cycle services system of the present invention. In FIG. 13, elements which correspond to elements in FIG. 11 are given corresponding names. For example, client 1100 in FIG. 11 corresponds to client 1300 in FIG. 13. In particular, to initiate the persisting process, the client 1300 sends a release command to the Talon server 1308 as indicated by arrow 1302. This process is indicated in FIG. 14 which starts in step 1400 and proceeds to step 1402 where the object model adapter receives the release command and the object name. The object model adapter 1304 then creates a moniker and sends the moniker back to the client 1300 as indicated by arrow 1324 in step 1404.

The client 1300 also streams the object into a local repository 1328 as indicated by data stream 1326. The local repository can be a file system or, in the case that the client is a Java program, a JAR file. The local repository 1328 holds the local state of the client program, whereas the actual state of the remote object is held in the persistent repository 1320 which could be a file system or a relational or object-oriented database.

In accordance with the principles of the invention, the client q1300 streams the object data to the local repository 1328 using a TalonOutputStream object. When the TalonOutputStream object encounters the object, or a reference to the object, in the stream, it substitutes the moniker for the object or reference in the data stream which is stored in the local repository 1328 as indicated in step 1406.

The object model adapter 1304 also applies the moniker to the life cycle services object 1310 as indicated in step 1408. The life cycle services object then removes the object from the runtime repository 1316. In addition, as indicated in step 1410, the moniker is used to create a directory service adapter 1312 which, as indicated in step 1412, removes any object references from the existing directory service 1314.

Next, the life cycle services object 1310 sends the object data to a persistent repository 1320 as indicated by arrow 1318 and as set forth in step 1414. The persistence operation then finishes in step 1416.

Figure 15:
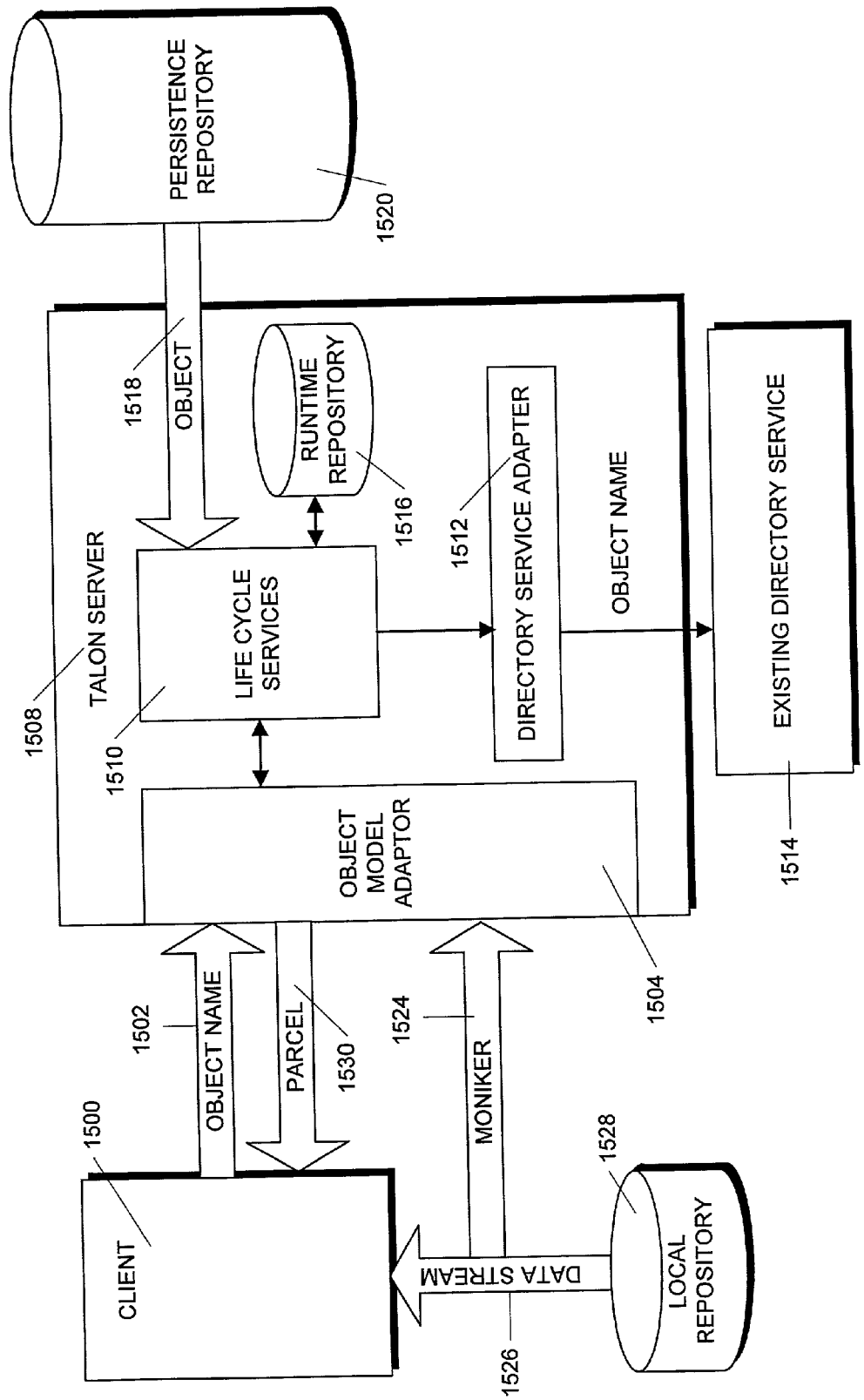
FIG. 15 is a schematic diagram illustrating the resurrection of an object using the illustrative framework system.
Figure 16:
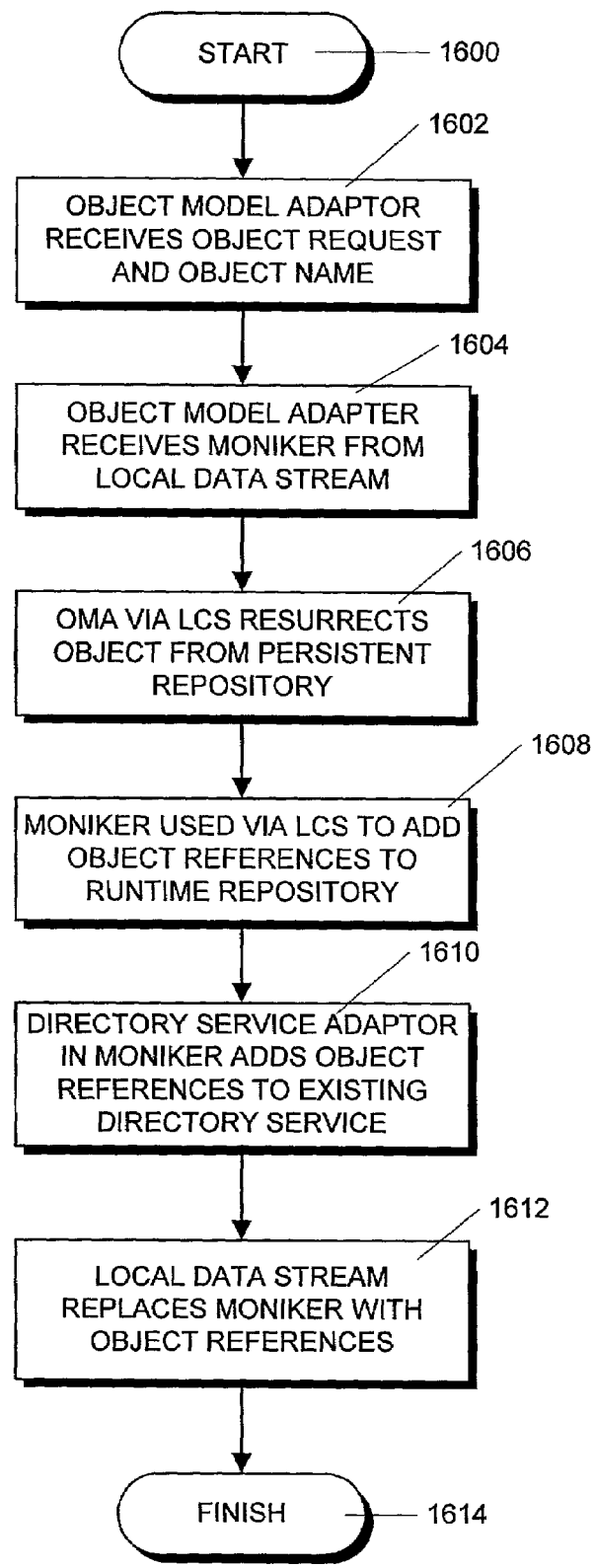
FIG. 16 is a functional flow diagram of the method used in the resurrection operation of FIG. 15.

FIGS. 15 and 16 illustrate the objects and steps used in resurrecting an object in accordance with the inventive life cycle services system. In FIG. 15, elements which correspond to elements in FIGS. 11 and 13 are given corresponding names. For example, client 1100 in FIG. 11 corresponds to client 1300 in FIG. 13 and client 1500 in FIG. 15. The resurrection object begins with a request for the object from the client 1500 to the talon server 1508 as indicated schematically by arrow 1502. The process is described in FIG. 16 which starts in step 1600 and proceeds to step 1602. In step 1602, the talon server 1508 receives the object request and the object name.

The client 1500 also requests the object from the local repository 1528 utilizing a TalonInputStream object, as described previously. When a moniker object is encountered in the data stream 1526, the TalonInputStream object forwards the moniker object to the object model adapter 1504 as indicated schematically by arrow 1524. In step 1604 the object model adapter 1504 receives the moniker from the local data stream.

Next, the object model adapter 1504 uses a life cycle services object 1510 to resurrect the requested object from the persistence repository 1520 as indicated schematically by arrow 1518 and as set forth in step 1606. Next, the moniker object is used by the life cycle services object 1510 to add object references to the runtime repository 1516 as illustrated in step 1608.

In step 1610, the directory service adapter implementation in the moniker (illustrated as directory service adapter 1512) adds object references to the existing directory service 1514. The object model adapter 1504 then returns the object references in a parcel object as indicated schematically by arrow 1530. The local data stream then replaces the moniker in the data stream 1526 with the object references in the parcel object 1530 as indicated in step 1612. The process then finishes in step 1614.

A software implementation of the above-described embodiment may comprise a series of computer instructions either fixed on a tangible medium, such as a computer readable media, e.g. a diskette, a CD-ROM, a ROM memory, or a fixed disk, or transmissible to a computer system, via a modem or other interface device over a medium. The medium can be either a tangible medium, including, but not limited to, optical or analog communications lines, or may be implemented with wireless techniques, including but not limited to microwave, infrared or other transmission techniques. It may also be the Internet. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software, pre-loaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, although the description was directed to a particular language, other object-oriented languages would also be suitable for the invention. Similarly, although a particular hardware system and operating system is described, other hardware and operating system software could be used in the same manner as that described. Other aspects, such as the specific instructions utilized to achieve a particular function, as well as other modifications to the inventive concept are intended to be covered by the appended claims.

What is claimed is:

1. Apparatus for use with a computer system having a memory, a local storage and an existing directory service operating in the memory, the apparatus providing naming and life cycle services for a distributed object and comprising:
   a moniker object which contains an identifier that universally identifies an instance of the distributed object and a moniker name; and
   a first stream object which automatically substitutes the moniker object for the distributed object during the streaming of the distributed object out from the memory to the local storage so that the moniker object is stored in the local storage in place of the distributed object.

2. Apparatus according to claim 1 wherein the first stream object substitutes the moniker object for the distributed object when the distributed object is persisted.

3. Apparatus according to claim 1 further comprising a second stream object which automatically substitutes a reference to the distributed object for the moniker object during the streaming of the moniker object in from the local storage to the memory so that a reference to the distributed object is created in memory in place of the moniker object.

4. Apparatus according to claim 3 wherein the second stream object substitutes the moniker object for the distributed object when the distributed object is resurrected.

5. Apparatus according to claim 1 wherein life cycle services are provided by associating with the moniker object a predefined policy which specifies how and when life cycle services are performed.

6. Apparatus according to claim 5 further comprising a life cycle services object which responds to the predefined policy by controlling the life cycle of the distributed object.

7. Apparatus according to claim 1 further comprising a runtime repository which includes a database of moniker name-object reference pairs.

8. Apparatus according to claim 7 further comprising a directory service factory object which responds to the moniker name by instantiating a directory service adapter object for applying the moniker name to the existing directory service when the runtime repository does not contain the moniker name.

9. Apparatus according to claim 1 wherein the distributed object is instantiated in accordance with an object model and the apparatus comprises an object model adapter which processes distributed objects instantiated with the object model.

10. Apparatus according to claim 9 wherein the object model adapter returns a reference to the distributed object together with a moniker object associated with the distributed object.

11. A method for use with a computer system having a memory, a local storage and an existing directory service operating in the memory, the method providing naming and life cycle services for a distributed object and comprising the steps of:
   (a) instantiating a moniker object which contains an identifier that universally identifies an instance of the distributed object and a moniker name; and
   (b) using a first stream object to automatically substitute the moniker object for the distributed object during the streaming of the distributed object out from the memory to the local storage so that the moniker object is stored in the local storage in place of the distributed object.

12. A method according to claim 11 wherein step (b) comprises the step of:
   (b1) using the first stream object to substitute the moniker object for the distributed object when the distributed object is persisted.

13. A method according to claim 11 further comprising the step of:
   (c) using a second stream object to automatically substitute a reference to the distributed object for the moniker object during the streaming of the moniker object in from the local storage to the memory so that a reference to the distributed object is created in memory in place of the moniker object.

14. A method according to claim 13 wherein step (c) comprises the step of:
   (c1) using the second stream object to substitute the moniker object for the distributed object when the distributed object is resurrected.

15. A method according to claim 11 further comprising the step of:
   (d) associating with the moniker object a predefined policy which specifies how and when life cycle services are performed.

16. A method according to claim 15 further comprising the step of:
   (e) instantiating a life cycle services object which responds to the predefined policy by controlling the life cycle of the distributed object.

17. A method according to claim 11 further comprising the step of:
   (f) creating a runtime repository which includes a database of moniker name-object reference pairs.

18. A method according to claim 17 further comprising the step of:
   (g) instantiating a directory service factory object which responds to the moniker name by instantiating a directory service adapter object for applying the moniker name to the existing directory service when the runtime repository does not contain the moniker name.

19. A method according to claim 11 wherein the distributed object is instantiated in accordance with an object model and wherein the method comprises the step of:
   (h) instantiating an object model adapter which processes distributed objects instantiated with the object model.

20. A method according to claim 19 wherein step (h) comprises the step of:
   (h1) returning a reference to the distributed object together with a moniker object associated with the distributed object.

21. A computer program product for use with a computer system having a memory, a local storage and an existing directory service operating in the memory, the computer program product providing naming and life cycle services for a distributed object and comprising a computer usable storage medium having computer readable program code thereon including:
   class code for instantiating a moniker object which contains an identifier that universally identifies an instance of the distributed object and a moniker name; and
   class code for instantiating a first stream object which automatically substitutes the moniker object for the distributed object during the streaming of the distributed object out from the memory to the local storage so that the moniker object is stored in the local storage in place of the distributed object.

22. A computer program product according to claim 21 wherein the class code for instantiating a first stream object comprises method code for substituting the moniker object for the distributed object when the distributed object is persisted.

23. A computer program product according to claim 21 further comprising class code for instantiating a second stream object which automatically substitutes a reference to the distributed object for the moniker object during the streaming of the moniker object in from the local storage to the memory so that a reference to the distributed object is created in memory in place of the moniker object.

24. A computer program product according to claim 23 wherein the class code for instantiating the second stream object includes method code for substituting the moniker object for the distributed object when the distributed object is resurrected.

25. A computer program product according to claim 21 wherein the class code for instantiating the moniker object further comprises a method for associating with the moniker object a predefined policy which specifies how and when life cycle services are performed.

26. A computer program product according to claim 25 further comprising class code for instantiating a life cycle services object which responds to the predefined policy by controlling the life cycle of the distributed object.

27. A computer program product according to claim 21 further comprising program code for creating a runtime repository which includes a database of moniker name-object reference pairs.

28. A computer program product according to claim 27 further comprising class code for instantiating a directory service factory object which responds to the moniker name by instantiating a directory service adapter object for applying the moniker name to the existing directory service when the runtime repository does not contain the moniker name.

29. A computer program product according to claim 21 wherein the distributed object is instantiated in accordance with an object model and wherein the computer program product comprises class code for instantiating an object model adapter which processes distributed objects instantiated with the object model.

30. A computer program product according to claim 29 wherein an instantiated object model adapter comprises a method for returning a reference to the distributed object together with a moniker object associated with the distributed object.

31. Apparatus according to claim 1 wherein the first stream object comprises means operable during the streaming of the distributed object out from the memory to the local storage for storing the distributed object in a persistent repository that is different from the local storage.

32. Apparatus according to claim 31 wherein the persistent repository is located remotely from the local storage.

33. A method according to claim 11 further comprising:
(c) using the first stream object during the streaming of the distributed object out from the memory to the local storage to store the distributed object in a persistent repository that is different from the local storage.

34. A method according to claim 33 wherein the persistent repository is located remotely from the local storage.

35. A computer program product according to claim 21 wherein the first stream object comprises program code operable during the streaming of the distributed object out from the memory to the local storage for storing the distributed object in a persistent repository that is different from the local storage.

36. A computer program product according to claim 35 wherein the persistent repository is located remotely from the local storage.

* * * * *